(12) United States Patent
Kwan

(10) Patent No.: US 7,376,612 B1
(45) Date of Patent: May 20, 2008

(54) SYSTEM AND METHOD FOR CONDUCTING AN ELECTRONIC FINANCIAL ASSET DEPOSIT AUCTION OVER COMPUTER NETWORK

(76) Inventor: Khai Hee Kwan, 1 Roma Ave, Kensington, NSW (AU) 2033

( * ) Notice: Subject to any disclaimer, the term of this patent is extended or adjusted under 35 U.S.C. 154(b) by 0 days.

(21) Appl. No.: 09/534,233

(22) Filed: Mar. 24, 2000

(51) Int. Cl.
*G06Q 40/00* (2006.01)
(52) U.S. Cl. ............... 705/37; 705/36; 705/35; 705/5; 705/26; 238/58
(58) Field of Classification Search ........... 705/37, 705/35, 36, 26, 38, 67, 64, 23; 395/226
See application file for complete search history.

(56) References Cited

U.S. PATENT DOCUMENTS

| | | | | |
|---|---|---|---|---|
| 4,974,878 | A * | 12/1990 | Josephson | 283/58 |
| 5,794,207 | A * | 8/1998 | Walker et al. | 705/1 |
| 5,826,244 | A * | 10/1998 | Huberman | 705/37 |
| 5,966,699 | A * | 10/1999 | Zandi | 705/38 |
| 6,055,518 | A * | 4/2000 | Franklin et al. | 705/37 |
| 6,112,188 | A * | 8/2000 | Hartnett | 705/35 |
| 6,167,386 | A * | 12/2000 | Brown | 705/37 |
| 6,188,993 | B1 * | 2/2001 | Eng et al. | 705/35 |
| 6,233,566 | B1 * | 5/2001 | Levine et al. | 705/36 |
| 6,285,989 | B1 * | 9/2001 | Shoham | 705/35 |
| 6,598,027 | B1 * | 7/2003 | Breen et al. | 705/26 |
| 2002/0082981 | A1 * | 6/2002 | Madden | 705/37 |

OTHER PUBLICATIONS

Former Tennessee Banker Banned From Industry for Misusing Confidential Data Louis Whiteman. American Banker. New York, N.Y.: Dec. 15, 1998. vol. 163, Iss. 238; p. 6).*

* cited by examiner

*Primary Examiner*—Frantzt Poinvil
*Assistant Examiner*—Clement Graham

(57) ABSTRACT

A computer system for conducting an electronic financial asset deposit auction over a computer network such as the Internet. The computer system includes a computer connected to the Internet, which performs the following functions: (1) receiving an electronic deposit application form from a prospective depositor; (2) providing such application to a deposit authorizer's computer over the computer network for approval; (3) receiving an electronic message from the deposit authorizer's computer indicating whether or not such deposit has been approved; (4) entering the deposit application into a database that is accessible to bidder/borrowers via the computer network, if the deposit is approved; and (5) maintaining the deposit application in the database for a predetermined period time during which bidder/borrowers may submit bids and the prospective depositor may accept a bid.

20 Claims, 3 Drawing Sheets

SYSTEM AND METHOD FOR CONDUCTING AN ELECTRONIC FINANCIAL ASSET DEPOSIT AUCTION OVER COMPUTER NETWORK

CROSS-REFERENCE TO RELATED APPLICATIONS

Nil

STATEMENT REGARDING FEDERAL SPONSORED RESEARCH OR DEVELOPMENT

Not Applicable

REFERENCE TO A MICROFICHE APPENDIX

Not Applicable

FIELD OF THE INVENTION

The present invention relates to system and method for conducting an electronic financial asset deposit auction such that a prospective lender/depositor may choose among financial bids such as borrowing rate and non-financial bids the one that offers the most favorable terms and return potential. More particularly, the present invention relates to conducting an electronic financial asset deposit auction over a computer network, such as the Internet.

BACKGROUND OF THE INVENTION

Traditionally, a person in need to find the highest return for his financial asset such as cash or shares will be faced with a number of difficult choices where he/she is faced with many offerings being maintained in accordance to a fix number of pre-determined criteria. He/she is asked to search a number of banking sites in order to find the best rates/offerings. While it is not difficult to see the depositing requirements for cash in the form of a fixed deposits or quick 24 hours rate, this invention also includes other type of financial assets such as shares which can be temporarily "lend" or deposited to a borrower in return for some interest cost. Share lending may not be well-known outside of the financial circle but it is widely practise since one of the criteria for shorting a market is to have shares-on-hand. Speculators who "short" a market do not have shares to begin with and if a market should go against them, they may have to resort to buying these shares back (which can be expensive) or temporary "borrow" them in the belief that the "rental" cost is less than the profits earned when the market does fall.

The current situation allows for prospective depositors to do manual search in accordance to his risk/return requirements and the credit risk of the Institution that provides such a facility. This invention improves on this by providing a discovery method using auction and includes a method where such financial institution or borrowers are checked for their credit suitability prior to allowing them to participate. While there are major portal such as Yahoo! and others that provide independent links to the such enabling institutions, they rarely help in determining the best deal. A search engine is only as good as the information provided for it to functions. Beyond that, it does not have the capabilities to capture risk/return values perceived by others. It can only provide the information but not the analysis. This Invention uses the auction method as an alternative to discovering a better result and hopefully the underlying analysis is reflected as well in regards to a particular risk/return requirement.

In this traditional way of looking for a good deal, the choice of using a search engine is rather limited—they are generally localised to the data captured by the database. Moreover, in order to compare different borrowers, the depositor needs to individually contact each one to determine their suitability in accordance to his risk/return preferences. There may be some straight vanilla offerings such as fixed term interest rate or a combination of fixed and floating or negotiable rates which the depositor must individually seek out.

The drawbacks for obtaining a suitable return through an agency or search portal is that (1) a limitation to data captured on the database be in on the Internet or from papers; (2) searching service is very time consuming and consequently expensive; (3) dealing with a regular agency is limited to regular business hours and they may not be independent; and (4) quality of borrowers varies and depositors usually are not able to ascertain their qualities.

It is therefore an object of the present invention to provide a system for conducting an electronic financial asset depositing auction wherein a prospective lender/depositor's requirements and contacts are auctioned off to a large number of potential borrower to get or discover the best rate within the shortest possible time;

It is an another object of the present invention to include financial assets such as shares in such a lending; and It is a further object of the present invention that such financial asset depositing auction be conducted by using a computer network or networks, such as the Internet, which is accessible to a great number of prospective borrowers, as well as a great number of lenders.

SUMMARY OF THE INVENTION

The present invention provides system and method for conducting a financial asset depositing auction using a computer network or networks.

In accordance with the present invention, a system for conducting an electronic financial asset depositing auction comprises a client computer, a host computer and at least one computer network connected to said computers. The host computer performs the following functions: (1) making available a financial asset depositing application over the World Wide Web to a prospective lender/depositor over the computer network when the lenders/depositor's computer connects to its web site; (2) receiving the financial asset depositing application completed by the lender/depositor over the computer network; (3) forwarding the completed application form to a host authorizer where the host authorizer will check for appropriateness and suitability of the application, such criteria being determine from time to time depending on demand requested by potential borrowers based on risk/return attributes; (4) receiving an electronic message from the host authorizer indicating whether or not the requested application is approved for solicitation; (5) providing a record of the financial asset depositing application to a database, if the lender/depositor is approved; and (6) maintaining such record in the database for access by participating borrowers for a predetermined period of time, before a bid is accepted. The host computer is also required to protect the identities of all participants until such time when an auction is decided and to ensure that privileged information such as contacts of the lender/depositor is securely stored until such time as when the winning bid is decided by the lender/depositor and shall then be released exclusively to the said bidder alone.

In a preferred embodiment, the host computer is a computer server, and the computer network is the Internet. The server computer is connected, via the Internet, to a lender/depositor computer and a plurality of borrowers' computers.

Alternatively, more than one computer network may be used in the system of the present invention. For example, one computer network, such as the Internet, is used to connect the lender/depositors' computer to the server computer; a proprietary computer network is used to connect the borrowers' computers to the server.

During the financial asset depositing auction process, a list of available lender/depositors and their terms (including any special requirement such as warranty, charges etc but without contact information) are kept open in the database for access by the approved bidders. Each application is open for access for a predetermined period of time, such as one week from the day the financial asset depositing application is approved and entered into the database. In some cases shorter time is permitted. Longer time is also permitted. Preferably, information on the bids submitted for each application is also included in the database for access by approved and in restricted circumstances, non-approved bidders. The latter being able to follow but not participate in the auction. An approved bidder may download the available information including bids from other bidders from the database to its own computer to analyze. An approved bidder may submit bids in any form including rate of borrowing, other financial assets in the form of opportunities for any of the applicants listed to the server computer over a computer network, or revise or withdraw from any bids he/she submitted before they are accepted.

During the time a lender/depositor application is in the database which is open for bidding, the lender/depositor may download bidding information on his or her applicant including all the bids submitted for the purpose from the server computer to his/her own computer over a computer network. The lender/depositor may only accept a particular bid by sending an electronic instruction to the server computer over a computer network after the auction is closed. After receiving such instruction, the server computer will verify that the bid is good and honorable and sends a message over a computer network to the computer of the bidder whose bid has been accepted, and withdraws the application from the database. The host server will also sent rejection messages to unsuccessful bidders. The host server will then provide access to the successful bidder to the true identity of the lender/depositor including contact information so both parties can be contacted and complete the contractual transaction. The amount offered and submitted by the lender/depositor is usually transfer to an escrow account agreed mutually by both parties and the host authoriser at the outset.

If a lender/depositor does not accept any bid from borrowers during the predetermined time, or if no bid is submitted by any borrowers, the lender/depositor's application record is withdrawn from the database and no action is taken. To re-enter the auction, a lender/depositor may reapply for another financial asset depositing auction or to request an extension for another predetermined period of time by sending an electronic instruction to the server computer.

In the preferred embodiment, the server computer further includes a World Wide Web site which provides information on the electronic financial asset depositing auction process and a computer financial asset depositing program designed to take a prospective lender/depositor step-by-step through the application process. Such program will be in the form of providing a login and assigning a handle for the applicant to protect the true identity. Information will be sought from the applicant including personal contact, bank account data and personal risk/return profile. An off-line verification process will also be included such as sending confirmation letters to the applicant reachable at their stated address or providing a telephone call etc. An on-line verification procedure including digital certificates is also employed to check for any illegality in the information provided or any other criteria as dictate by host authority from time to time. After it is approved, only the information agreed by both applicant and host authority will be provided for displayed to all bidders. Information which will be excluded are such as contact information and the real name of applicants. The applicant has the complete freedom to select which bid and not necessary the highest bid. Information on the successful bidder may be made public.

The present invention provides a convenient way for a prospective lender/depositor to obtain various forms of bids from suitable borrowers and to choose the one that offers the most favorable terms in accordance to his risk/return profile. In traditional method such as using a search engine, such is not available or is too mundane to go through. The invention allows for another channel to meet the expectation of both lender/depositor and borrowers. This invention is to provide an insight into determining how much is time and cost can be save using a competitive bidding method. This invention is designed to provide an alternative to discovering a better way of earning income from ones financial assets.

BRIEF DESCRIPTION OF THE DRAWINGS

These and other objects, features and advantages of the invention are more fully set forth in the accompanying Detailed Description in which.

DETAILED DESCRIPTION OF THE INVENTION

The present invention provides system and method for conducting an electronic financial asset deposit auction. In accordance with the present invention, a prospective leader/depositor, is more likely to discover a suitable match at more realistic terms and effectively than those he/she would have obtained by traditional ways. The system and method of the present invention offers to differentiate between a preference for risk or return for both lender/depositors and borrowers. For example, there are individuals who prefer higher risk than available from standard banking depositing facilities by accepting securities in exchange under certain terms. There are borrowers such as banks who from time to time may willing to pay to secure some critical funding requirements or shares to cover their open position overnight.

Accordingly, the bidder may define proposed terms of deposit in the bid application under various combinations such as period of deposit, type of deposit, type of payment schedule, deposit rate, securities in exchange and terms of exchange. A responsive bidder will bid by either matching these terms or better them to existing bids by other bidders.

Figure 1:
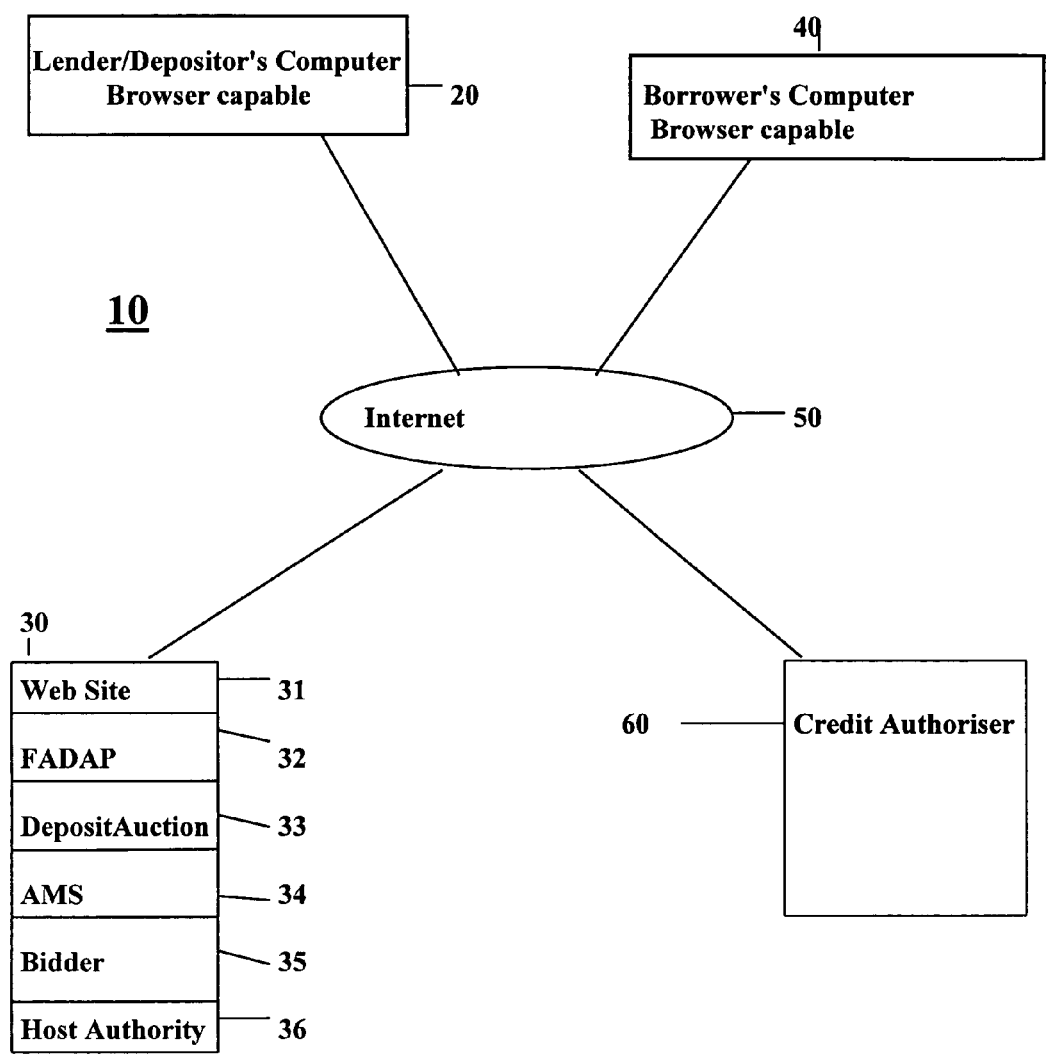
FIG. 1 illustrates a computer network system for conducting an electronic financial asset deposit auction in accordance with the present invention.

FIG. 1 is a block diagram of a computer network system 10 of the present invention. Computer system 10 comprises at least one client computer 20, preferably a computer workstation. Computer 20 is connected to a host server computer 30, a Credit Authority Server Computer 60 and a plurality of borrowers' computers 40, over at least one computer network 50.

Computer 20 is a computer generally known in the field of computers. A host server computer 30 contains hardware and software adapted to communicate with other computers over a computer network and to make available computer files or software stored in the server computer or a storage device connected thereto such that they can be accessed by a person from another computer connected to the network.

Although one host computer server is adequate for the purpose of this invention, to achieve the benefit of redundancy, data security and distributed computing, more than one computer servers is preferred.

The computer system of the present invention operates as follows:

Computer 30 makes available a computer financial asset depositing application program (FADAP) 32 which is a client side program written in either Php3 or Active Server Pages (ASP), which is accessible by a prospective lender/depositor at lender/depositor's computer 20 through computer network 50. FADAP 32 guides the lender/depositor step-by-step to complete an electronic financial asset depositing application form contained in the FADAP 32 and sends it back to computer 30 via computer network 50. After receiving the completed electronic application, computer 30 reformats and checks the financial asset depositing application at the server side where it is reviewed by a Host Authority 36 to see if the lender/depositor is qualified. To minimize server's processing power some information may be checked for accuracy at the client side using Javascript before it is being submitted. These will be minor inputs such as dates, spelling and so on. FADAP 32 also provides for the lender/depositor to adopt a handle or code name to protect the true identity of the lender/depositor when displaying the information later. The actual assignment and administration of these handles are done by the AMS 34. Personal information such as contact will be scripted as hidden text when submitted and will only be known by the submitter. In addition, a special account will be set up for the submitter which is protected by a password and user's login to ensure that no one can tamper with the data.

An electronic message indicating whether or not the requested application is approved for auction is then sent from host server computer 30 to computer 20 via computer network 50, which is received by computer 20. If the message indicates that the application has been approved, a record of such application is then entered by computer 30 into a database which is accessible by borrowers computers 40 through computer network 50.

The financial asset depositing record is maintained in the database for a predetermined period of time during which the borrowers may electronically submit bids via computer network 50. At any time during this period, a lender/depositor may download a status report of his/her application including bids submitted for his/her application onto his/her computer 20 via computer network 50. The lender/depositor may accept any of the bids by sending an electronic instruction to computer 30 through computer network 50; computer 30 then withdraws the record of the financial asset depositing application from the database and sends a message to the borrower's computer whose bid has been accepted and rejection messages to unsuccessful borrowers; the auction process is completed.

An advantage of the present invention is that because the financial asset depositing auction is conducted over a computer network, prospective borrowers/lenders/depositors can avoid expensive investment in searching for their match. In fact by using an auction style, the discovery rate is much more efficient.

The method and system for conducting an electronic financial asset deposit auction of the present invention will now be described in detail.

FIG. 1 depicts a preferred embodiment of a computer system 10 for conducting an electronic financial asset deposit auction of the present invention. Computer network system 10 comprises a general purpose computer 30 as a server connected to computer network 50. Preferably, server computer 30 is a computer workstation, and computer network 50 is the Internet. More preferably, server computer 30 is connected to the Internet 50 via the fastest available connections. A connection to Credit Authoriser 60 is provided through the Internet 50.

Server computer 30 includes: (1) a World Wide Web site 31 such as www.depositauction.com including the FADAP 32; (2) a computer software 33, designated herein as DepositAuction., for managing the electronic financial asset depositing auction; (3) a computer software 34 called Auction Management Systems or AMS (4) Bidder program 35 a program for borrowers to apply and bid with and (5) Approving/Host Authority 36 a program that checks whether all criteria are meet before posting the application. They are described in more detail below. All programs are accessible via their respective clients and are managed at the server side.

A. The Web Site

In the preferred embodiment, Web site 31 provides the following information or applications:

(1) A summary of current eligibility status;

(2) Description of the types of bids available via the computer financial asset depositing auction system such as interest rates, shares etc;

(3) Description of the organization, designated herein as www.depositauction.com., that runs the electronic financial asset depositing auction and list of benefits and costs for using the auction system;

(4) Description of required legal disclosure for using the financial asset depositing system;

(5) Pre-qualification login and handle assignment forms;

(6) Forms for Personal facts, contacts, questions and answer;

(7) Question and answer chat section;

(8) Financial asset depositing application program (FADAP) 32;

(9) Bidder program (BP) 35

(10) Technical support for FADAP and the BP; and

(11) Advertiser billboard.

The pre-qualification and handle assignment form is a computer application software created for a prospective lender/depositor to pre-qualify himself. The pre-qualification form notifies the prospective lender/depositor, after he/she fills out the pre-qualification form, if he/she is too far from qualifying for a financial asset depositing auction that he desires. The main question will be the verifiable financial assets, consent to participate and the assignment of a handle which is nick name and a password used throughout the application.

B. Financial Asset Depositing Application Program ("FADAP") 32

Designed to be directly assessable by a prospective lender/depositor from the Web site to his/her own computer, FADAP is to be used by the prospective lender/depositor only. Preferably, major features of FADAP include:

(1) Depositing tutorial including legal rights etc in various countries;

(2) Personal Financial Planning tools;

(4) Personal Data application;

(5) Approval screening and consent agreement (6) Electronic submission of the financial asset depositing application;

(7) Uploading of video, photograph, voice-mail;

(8) Download borrowers' bids; and (9) Analysis of borrowers offers including credit reports, graphics and ranking based on certain criteria.

C. DepositAuction 33

Residing on server computer 30, DepositAuction 33 is a client/server database application which is used to manage the electronic auction. It makes available to borrowers a list of available lender/depositors and it makes available to a prospective lender/depositor a list of borrowers' bids submitted for the lender/depositor by potential borrowers.

D. Auction Management System 34

Auction management system (AMS) is a client/server application residing on server computer 30. It operates to manage the client database, active lender/depositor applications, current status of applications and all transaction including accounting functions. It is also responsible for electronically submitting a potential borrower's bid to a credit authority for approval. If the financial viability application is approved, AMS 34 operates to receive an approval notification transmitted from credit authorizer computer 60. It also operates to enter an approved bidder application into DepositAuction 33. Depending on the complexity of the lender/depositor's requirements, for example wanting to have a certain guarantee from a potential borrower is also provided for. AMS 34 is designed to be all purpose and can be adapted for as many administrative functions as possible.

When a lender/depositor accepts a bid, DepositAuction 33 notifies AMS 34 and AMS 34 sends messages to both the successful and the unsuccessful borrowers, informing them that the bid has been accepted and the auction is closed. It also withdraws the lender/depositor's record from DepositAuction 33 and informs the Credit Authorizer 60 that the amount from the lender/depositor (with their prior approval) is now to be transferred to be held in escrowed by AMS' account.

E. Bidder Program (BP) 35

Preferably, each of borrowers' computers 40 has accessed to Bidder 35 which is a client/server application which resides at Server 30, herein designated as Bidder 35, for use by the borrowers to participate in the electronic auction. The Bidder works to capture data submitted by the borrowers being networked to Computer 30 via a webpage. Major features of Bidder 35 include:

(1) Easy and secure download of available lender/depositor's application from the DepositAuction 33 database to borrowers' computers 40;

(2) Reporting functions to analyze lender/depositor's application to assist in preparation of bids;

(3) Easy and quick upload of bids including reward payment structure where incentives are tailored to win the bid etc.

(4) Bidding Agreements, Wire transfer Agreements, Taxation Information, Declaration, Consent, Login and selection of Handles (5) Any records such as nominated accounts, guarantee etc where appropriate are uploaded or be provided permission to access them as required later by Lender/depositor.

Now, the operation of the preferred embodiment depicted in FIG. 1 will be described with reference to the flow chart in FIGS. 2A and 2B.

Before a prospective lender/depositor applies for a financial asset depositing application through the auction system, he/she may first visit Web site 31 on server computer 30. Web site 31 describes the financial asset depositing auction process and provides information about the current availability environment such as competitors etc. If the prospective lender/depositor is interested to proceed further, he/she may access and fill out the electronic pre-qualification form page which ask for his/her consent, declaration, social security number, Nominate Bank Account, Nominated Amount, Tax ID and agreement to the conditions of the auction.

Once the lender/depositor decides to apply he/she will then download the FADAP 32 from the Web site.

FADAP 32 has many functions for example, it guides the lender/depositor step-by-step through the application. It prompts the lender/depositor for the necessary information and defines, as required, unfamiliar terms. In addition, FADAP 32 provides a check list of the various hard copy documents that must be submitted including bank account details and consent agreement.

After the financial asset depositing application is completed, FADAP 32 provides instructions to the prospective lender/depositor about the next step in the electronic application process.

After that, the prospective lender/depositor then submits a completed application to server computer 30 via the Internet, using the electronic submission feature of FADAP 32 at step 100.

The application form submitted by the prospective lender/depositor is received by server computer 30 (step 100). In practice this FADAP 32 is an input form written in ASP which captures all the information and is sent to Server 30 where it is then checked at step 100, 110, 120. This is the minimum requirement which authenticate that such application was indeed sent from a computer and record the IP address and check the telephone number used to access the network with the address. At Step 120, the application will be assessed on its legitimacy which requires certain agreements to be acknowledged and agreed upon. This includes items like Banks Accounts details and Tax ID, social security number etc. After that, the received financial asset depositing application may be examined by the Host Authority 36 to make sure that the application is completed and contains no obvious inaccuracies. Such details such as availability and ownership of funds or shares will be the main considerations which shall be verified by an external authority such as a Credit Authoriser 60. In a preferred embodiment, instead of a person examining the application, a software program may be used to examine the application.

After Host Authority (step 150) reviews the application, an electronic message is sent to computer server 20 via computer network 50 indicating whether the application is approved or denied.

If the application is approved by the host authorizer, an electronic message indicating the same is received by AMS 34 (step 170). AMS 34 then provides the lender/depositor's identification with a handle, password and login and record into DepositAuction 33. (step 180).

Once entered into DepositAuction 33 for auction, the lender/depositor's record is entered into a database within DepositAuction 33 and is held there open to access by borrowers for a predetermined period of time (e.g., a week). At any time, a participating approved borrower can log into DepositAuction 33 and access a list of available lender/depositor and bids submitted.

The Bidder Program 35 which is a client/Server application, located at the Server Computer 30 is used by a prospective borrower to prepare and to submit a bid.

Figure 2:
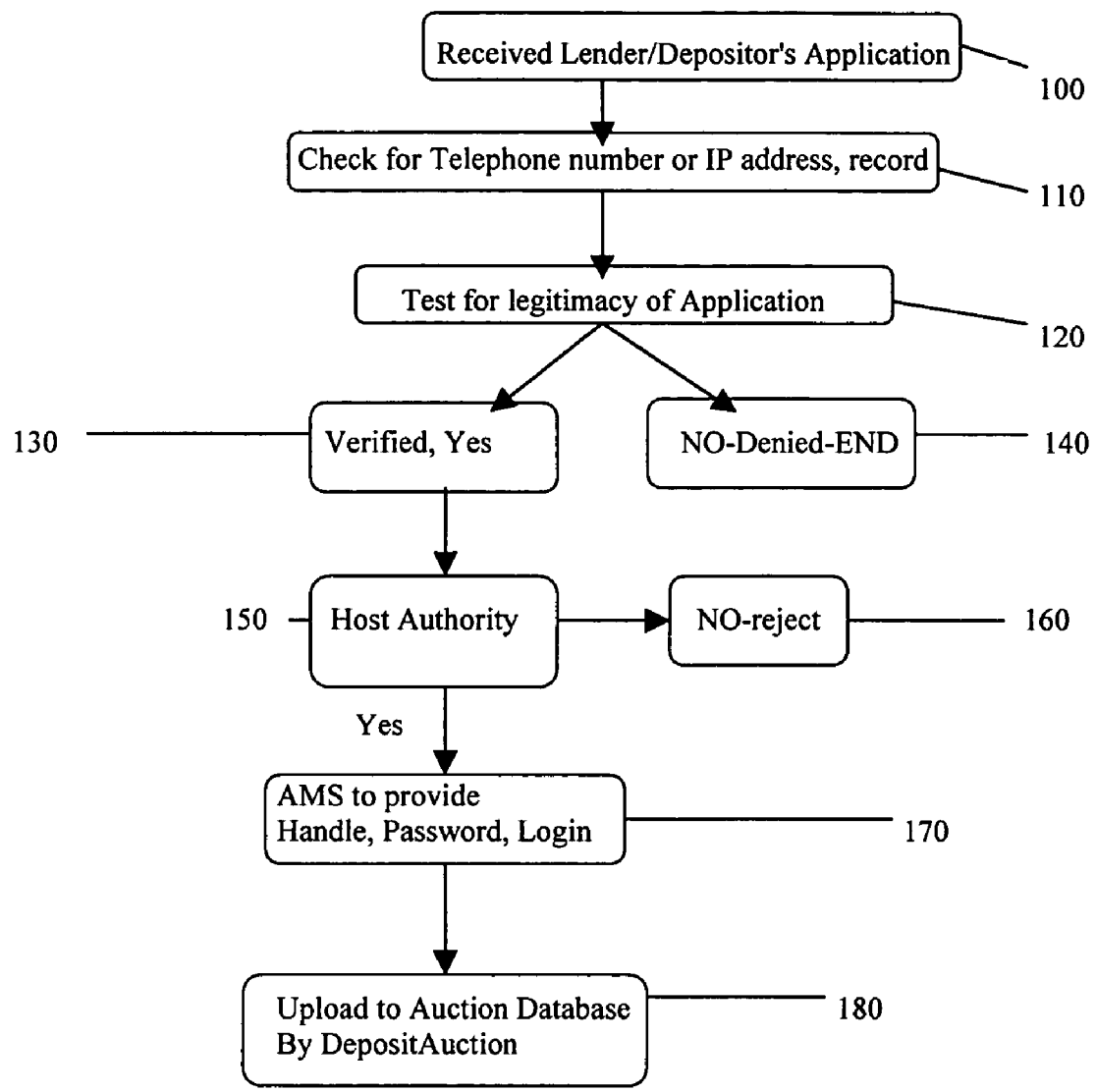
FIGS. 2A and 2B are flow charts depicting steps for conducting a financial asset deposit auction over a computer network in accordance with the present invention.
Figure 2:
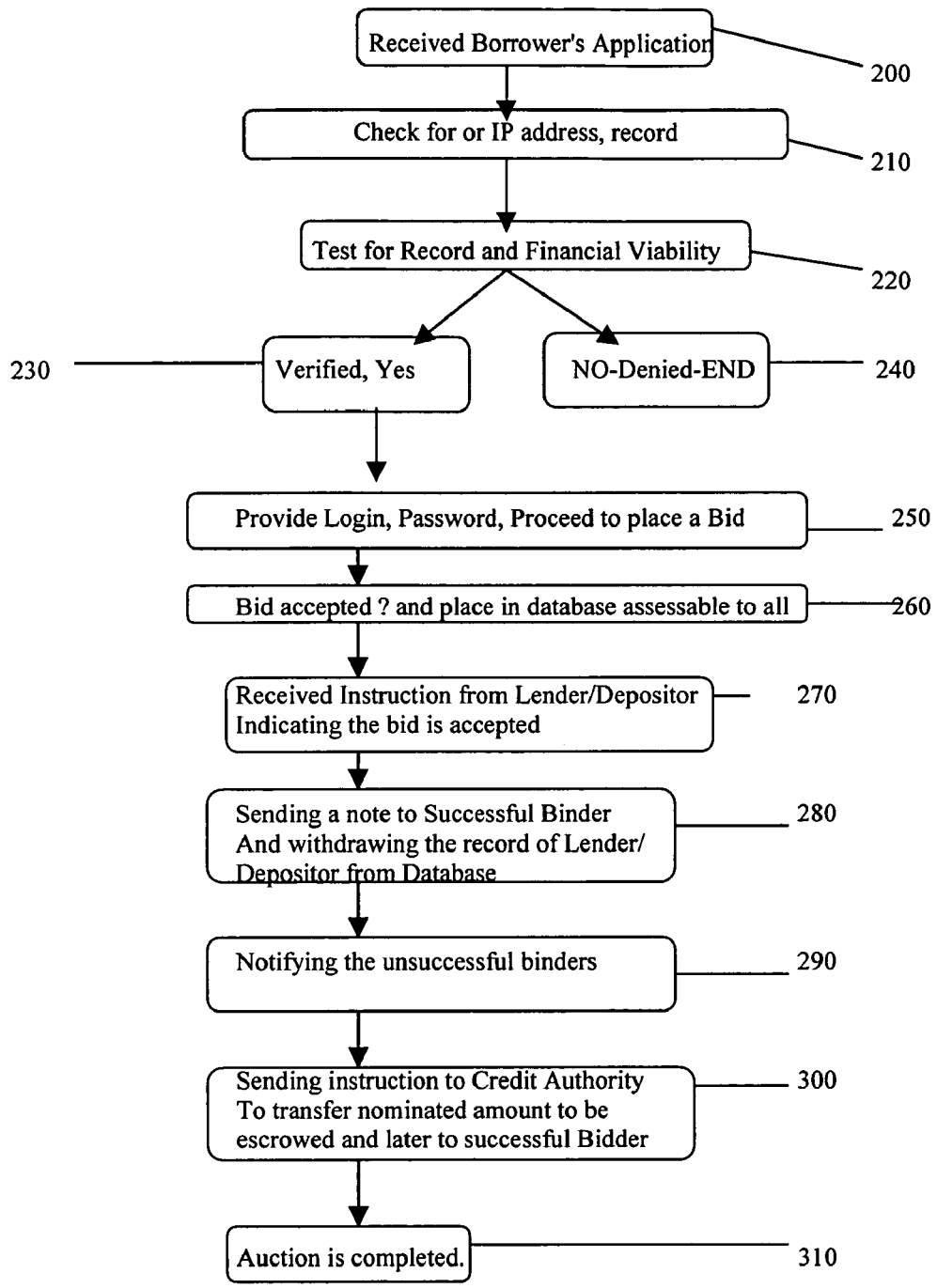

In FIG. 2B, the flowchart shows how a borrower is able to bid by first sending a borrower application using Bidder (step 200) to Server 30. Server 30 will receiving the application over network 50 and will test for IP address (step 210) and will then ask borrower to submit financial viability (step 220). This information is then forwarded to a Credit Authorizer 60. If it is verified (step 230), then it will proceed to AMS (34) where a login, password will be assigned (step 250) and the financial record of borrower be placed into the database. The borrower is then able to access the auction database after given authority by DepositAuction 33 and a bid may be placed (step 260)

In FIG. 2B, at step 270, we assume that a bid has been accepted by the lender/depositor and this instruction was sent to DepositAuction 33 which informs AMS 34. AMS 34 will notify at step 280 the successful bidder.

AMS 34 will sent an instruction to Credit authority 60 to transfer the amount submitted by the lender to an escrow account ready for final transfer to the borrower's account after agreeing to the details of the transactions by both parties (step 300). AMS 34 will also withdraw the lender/depositor's application from the database (step 280). AMS 34 will notify the unsuccessful bidders of their outcome. DepositAuction 33 will then close this particular auction at step 310.

In the preferred embodiment, during the auction period, a borrower who has submitted a bid uses The Bidder to revise and/or withdraw its bid at any time prior to the bid being accepted by the Lender/depositor. Similarly, a lender/depositor uses FADAP 32 to withdraw from the auction prior to accepting any bid.

It should be apparent to one of skill in the art that the system and method of the present invention can be used for auctions of different types of financial assets on a lending basis.

The claims which follow are to be interpreted to cover all of the equivalent structures and methods. The inventions, thus, not to be limited by the above exemplary disclosure, but only by the following claims.

I claim:

1. A method for soliciting competitive terms of deposit operating on a deposit auction system, said system including a programmed computer connected to a network accessible by a plurality of users within a first selected period of time and anonymity means for concealing the identities of prospective depositors, the method executable at said computer comprising:
   a) receiving a deposit application from a prospective depositor who is a respective one of the users offering money, securities or financial equivalent deposit offer terms;
   b) assigning a handle to conceal a real identity of said prospective depositor and displaying said depositor's application anonymously;
   c) receiving from at least one financial institution, who is a respective one of the users communicating over the network, at least a bid for said deposit application wherein said bid being deposit terms comprising at least one of: type of deposit auction over computer network guarantees, payment schedule, deposit rate, securities in exchange or terms of exchange; and
   d) receiving an electronic instruction from said prospective depositor, notifying and authorizing at least one selected financial institution to access a real identity and personal information of said prospective depositor for a second selected period of time.

2. The method according to claim 1, further comprising a step of receiving from said prospective depositor communicating over the network, an electronic instruction selecting at least one of responsive financial institutions bided for said depositor's application.

3. The method according to claim 1, includes a step of verifying the ownership of said money, securities or financial equivalent as subscribed by said prospective depositor.

4. The method according to claim 1, further comprising a step of maintaining data representative of bids for the prospective depositor's application in a database accessible to users over a network, said data comprising depositing terms, type of guarantees, payment schedule, deposit rate, securities in exchange and terms of exchange information on each of a plurality of submitted responsive bids.

5. The method according to claim 1, adapted to further promote a completely anonymous deposit auction, comprising:
   assigning a handle to conceal a real identity of said financial institution.

6. A deposit auction system including a computer connected to a network programmed to perform the method of claim 1.

7. A deposit auction system including a computer connected to a network programmed to perform the method of claim 2.

8. A deposit auction system including a computer connected to a network programmed to perform the method of claim 3.

9. A deposit auction system including a computer connected to a network programmed to perform the method of claim 4.

10. A deposit auction system including a computer connected to a network programmed to perform the method of claim 5.

11. Computer executable software code stored on a computer readable storage medium implementing the method of claim 1.

12. Computer executable software code stored on a computer readable storage medium implementing the method of claim 2.

13. Computer executable software code stored on a computer readable storage medium implementing the method of claim 3.

14. Computer executable software code stored on a computer readable storage medium implementing the method of claim 4.

15. Computer executable software code stored on a computer readable storage medium implementing the method of claim 5.

16. A deposit auction system for soliciting competitive terms of deposit connected to a network, said network comprising at least one client computer and a programmed computer further comprising a database of deposit applications, said network accessible by a plurality of users within a first selected deposit auction over computer network period of time, comprising:
   a) means for receiving a deposit application from a prospective depositor who is a respective one of the users offering money, securities or financial equivalent deposit offer terms;
   b) anonymity means for assigning a handle to conceal a real identity of the said prospective depositor for displaying said depositor's application anonymously;
   c) means for receiving from at least one financial institution, who is a respective one of the users communicating over the network, at least a bid for said deposit application offer wherein said bid being depositing terms comprising at least one of: type of guarantees, payment schedule, deposit rate, securities in exchange or terms of exchange; and
   d) means for receiving an electronic instruction from said prospective depositor, notifying and authorizing at least one selected financial institution to access a real identity and personal information of said prospective depositor for a second selected period of time.

17. The system according to claim 16, further comprising means for receiving from deposit applicant communicating over the network, an deposit auction over computer network electronic instruction selecting at least one of responsive financial institutions bided for said prospective depositor's application.

18. The system according to claim 16, further comprising means for verifying the ownership of said money, securities or financial equivalent as subscribed by prospective depositor.

19. The system according to claim 16, further comprising means for maintaining data representative of bids for the prospective depositor's application in a database accessible to users over a network, said data comprising depositing terms, type of guarantees, payment schedule, deposit rate, securities in exchange and terms of exchange information on each of a plurality of submitted responsive bids.

20. The system according to claim 16, adapted to further promote a completely anonymous deposit auction, by including means for assigning a handle to conceal a real identity of said financial institution.

\* \* \* \* \*

UNITED STATES PATENT AND TRADEMARK OFFICE
CERTIFICATE OF CORRECTION

| | | |
|---|---|---|
| PATENT NO. | : 7,376,612 B1 | Page 1 of 1 |
| APPLICATION NO. | : 09/534233 | |
| DATED | : May 20, 2008 | |
| INVENTOR(S) | : Khai Hee Kwan | |

It is certified that error appears in the above-identified patent and that said Letters Patent is hereby corrected as shown below:

Col. 10; in claim 1 line 15-16 please cancel the text "..deposit auction over computer network.."

Signed and Sealed this

Twenty-ninth Day of July, 2008

JON W. DUDAS
*Director of the United States Patent and Trademark Office*